(12) United States Patent　　(10) Patent No.: US 11,640,823 B1
Pemberton et al.　　(45) Date of Patent: May 2, 2023

(54) NATURAL LANGUAGE PROCESSING ROUTING

(71) Applicant: Amazon Technologies, Inc., Seattle, WA (US)

(72) Inventors: Joe Pemberton, Seattle, WA (US); Vijitha Raji, Sammamish, WA (US); Dhruva Lakshmana Rao Batni, Issaquah, WA (US); Archit Jain, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 208 days.

(21) Appl. No.: 17/038,478

(22) Filed: Sep. 30, 2020

(51) Int. Cl.
　　*G10L 15/22*　　(2006.01)
　　*G10L 13/08*　　(2013.01)
(52) U.S. Cl.
　　CPC .............. *G10L 15/22* (2013.01); *G10L 13/08* (2013.01)
(58) Field of Classification Search
　　CPC .............. G10L 15/22–2015/228; G10L 13/08
　　See application file for complete search history.

(56) References Cited

U.S. PATENT DOCUMENTS

| 11,195,534 | B1* | 12/2021 | Shen | G10L 17/00 |
| 11,355,098 | B1* | 6/2022 | Zhong | G10L 15/01 |
| 2019/0014205 | A1* | 1/2019 | Miloseski | H04M 1/72451 |
| 2020/0050788 | A1* | 2/2020 | Feuz | G10L 15/30 |
| 2020/0251111 | A1* | 8/2020 | Temkin | G10L 15/22 |
| 2020/0372108 | A1* | 11/2020 | Koduri | G06N 20/00 |

* cited by examiner

*Primary Examiner* — Abul K Azad

(74) *Attorney, Agent, or Firm* — K&L Gates LLP

(57) ABSTRACT

Devices and techniques are generally described for a speech processing routing architecture. First input data representing an input request may be received. First data may be sent to a first skill representing a first request for the first skill to evaluate an ability of the first skill to process the first input data. Second data may be sent to a second skill representing a second request for the second skill to evaluate an ability of the second skill to process the first input data. Third data may be received from the first skill indicating a first action performed by the first skill in response to receipt of the first input data. Fourth data may be received from the second skill indicating a second action performed by the second skill. The first skill may be selected for processing the first input data.

20 Claims, 8 Drawing Sheets

NATURAL LANGUAGE PROCESSING ROUTING

BACKGROUND

Automatic speech recognition (ASR) combined with language processing techniques may enable a computing device to retrieve and process commands from a user based on the user's spoken commands. In some systems, speech recognition and/or voice-controlled devices activate upon detection of a spoken "wakeword." Natural language processing is used to translate the spoken requests into semantic interpretations of the spoken command. A speech processing application (e.g., a "skill") is selected for processing the spoken request. Executable instructions are generated based on the semantic interpretation of the spoken command. The executable instructions are executed by the skill and a corresponding task is performed. Such speech processing and voice control may be used by personal computers, hand-held devices, telephone computer systems, and a wide variety of other computing devices to improve human-computer interactions and to control various systems.

DETAILED DESCRIPTION

Figure 1A:
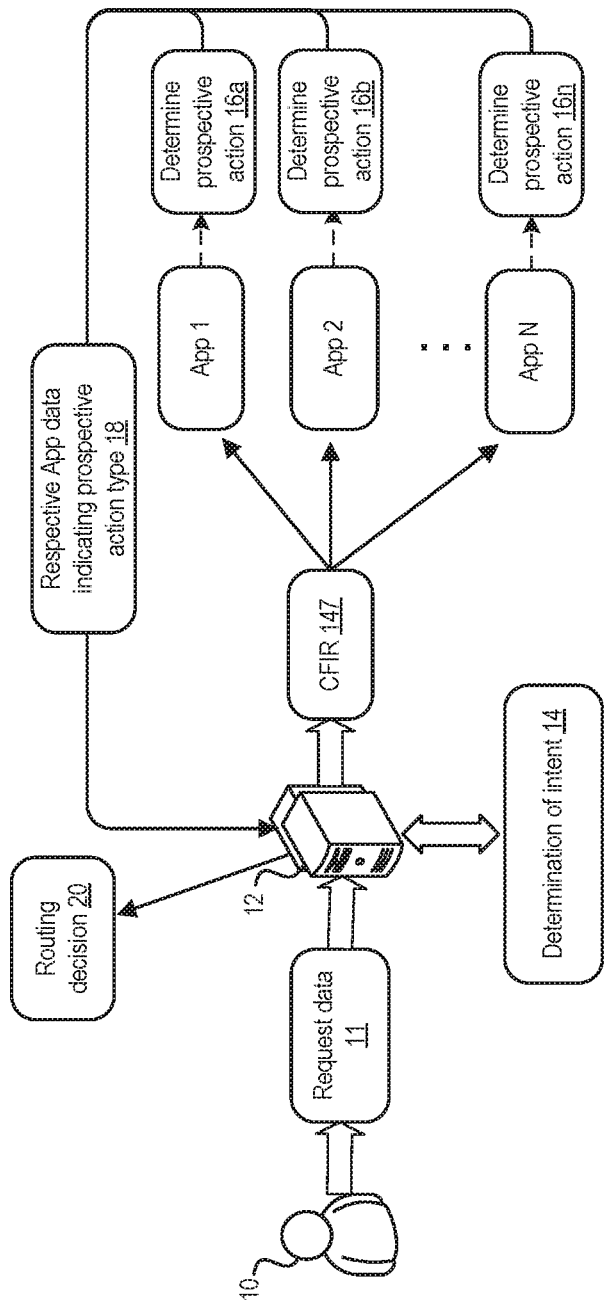
FIG. 1A is a block diagram illustrating an example system that may determine a routing destination for request data, in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language, resulting in specific executable commands or other type of instructions. Text-to-speech (TTS) is a field of computer science, artificial intelligence, and linguistics concerned with enabling computers to output synthesized speech. ASR, NLU, and TTS may be used together as part of a speech processing system.

Spoken language understanding (SLU) is a field of computer science, artificial intelligence, and/or linguistics that receives spoken language as an input, interprets the input, and generates executable commands that may be executed by one or more other computing devices and/or speech processing components. In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may be used with TTS where a machine learning model may receive input audio data (e.g., request data representing user request data and/or user text input data) and may generate output audio data in response to the utterance.

As used herein, user utterances, input text data, and/or any form of input data requests input to a speech processing system may be described by "request data" and/or "user request data." Such request data may change forms many times during processing of the request data by various components of the speech processing system, as described in further detail below. For example, initially the request data may be audio data and/or input text data representing a user question. The audio data may be transformed into text data by an ASR component of the speech processing system. The text data may be transformed into intent data by an NLU component of the speech processing system. The intent data may be used by an application, such as a speech processing application (e.g., a skill and/or some other component of an application) to perform an action (e.g., to generate action data that may be processed in order to take some corresponding action such as playing video and/or audio). "Request data" and/or "user request data" may refer to any data related to an input request to a speech processing system (e.g., including the various data forms described above, as each of the aforementioned data types relate to an input request to the speech processing system). In general, as used herein, speech processing applications may be any software (and/or combination of software and hardware) used during speech processing to take an action in response to input request data (e.g., natural language inputs such as user utterances and/or text). Speech processing application may process intent data representing the input request data. Such applications may include speech processing skills and/or other types of speech processing software.

As the number of applications continues to increase, selection of an application (e.g., a skill) for processing an input request is a non-trivial task. In various examples described herein, prior to routing a request to a particular application (e.g., a skill) for processing, a "Can fulfill intent request" (CFIR) may be sent to a number of candidate applications (e.g., a skill executed as part of an application) that could be selected for processing the current request. The CFIRs may be a request for the recipient applications to determine a type of action that the recipient applications would take in response to be selected for processing the current request. As described in further detail below, intent data describing an intent of the current request and/or slot data describing one or more entities associated with the current request may be sent to candidate applications together with a CFIR. Candidate applications may be selected by a shortlister, as described in further detail below.

In response to receipt of the CFIR, the intent data, and/or the slot data, applications may generate response data that indicates whether the applications (e.g., skills) are able to fulfill the request. In various examples, applications may evaluate an ability to fulfill a request based on a determination as to whether the application is effective to process the intent data and/or recognize the slot data that is provided with the CFIR. Additionally, the application may include a CFIR tag with the response data that indicates a particular action and/or type of action that the application would take if the application is ultimately selected for processing the current request. For example, the CFIR tag may be metadata indicating that the application is able to process the intent successfully. In another example, the CFIR tag may indicate that the application intends to engage the user in a dialog in response to being selected to process the current request. In another example, the CFIR tag may indicate that the application intends to initiate streaming of video and/or audio in response to being selected to process the current request. In another example, the CFIR tag may indicate that the application intends to render a spoken response (e.g., audio data output by a TTS component) to the user in response to being selected to process the current request. In another example, the CFIR tag may indicate that the application intends to change a setting of a device in response to being selected to process the current request. For example, the application may control a light switch, a thermostat, an appliance, an automated shutter, a vehicle, etc. In still another example, the CFIR tag may indicate that the application intends to output a semantically relevant error response related to the current request. In various examples, a application may take multiple actions for a given request. For example, a application may initiate playback of a song using an audio player and may display artwork related to the song and/or album. Accordingly, in response to a CFIR that includes a song playback intent, the application may generate a CFIR tag indicating that the application will initiate playback of audio and a second CFIR tag indicating that the application will display image data. It should be appreciated that the foregoing example is for illustrative purposes only. The particular CFIR tag data generated by a application may be determined based on the one or more actions that the application may take in response to the particular user request (as represented by the CFIR request). Action types indicated by CFIR tags may identify categories of action such as "initiate_audio_playback," "initiate_dialog_session," "initiate_TTS_response," "output_error_message," etc.

Upon receipt of such CFIR tags, the natural language processing system and/or other system that provides content in response to input requests may send the CFIR tags as a signal to a ranking component of the natural language processing system and/or other system. As described in further detail below, the ranking component may comprise one or more machine learned models effective to rank candidate applications (e.g., skills) for processing the current request (e.g., for processing input requests). The ranking component may rank the candidate applications (e.g., skills) such that the top-ranked applications are those that have been determined to lead to the best user experience. Accordingly, the CFIR tags may be used by the ranking component to better determine the best application(s) (e.g., skill(s)) for processing a current request. As described below, the ranking component may used other data to rank the candidate applications (e.g., skills). Other data that may be used includes context data (e.g., a time of day, device identifier, user account data), whether a particular setting and/or configuration is enabled for the particular device and/or account, whether a particular application (e.g., skill) is enabled, etc. In addition to using the CFIR tags as an online signal during inference, the CFIR tags may be batched and used to train/re-train various machine learned models of the dynamic routing architecture described herein. For example, the CFIR tags may be used to train a shortlister, a ranking component, a decider engine, etc.

In several examples described herein, request data may be sent to a natural language processing system. CFIR requests may be sent to one or more applications that may, in turn, determine the respective actions that the one or more applications would take if selected for processing the request data. Thereafter, the CFIR tag data indicating the prospective applications' actions may be used for selecting a particular application to which to route the request data. However, the various techniques described herein may be applicable in other contexts apart from natural language processing. For example, a user may enter a request for content and data representing the user's request may be sent to various prospective applications (e.g., candidate skills) that may be effective to perform respective actions (e.g., serving content, processing data, etc.) in response to the user's request. Each of the prospective applications may send CFIR tag data indicating the particular action that the application would take if selected for processing the user's request. Accordingly, an application may be selected for processing the request data on the basis of the CFIR tag data. As such, although a natural language processing implementation is described in many examples herein, the various techniques discussed herein may be applicable in non-natural language processing systems as well.

There may be a large number of applications and a large number of prospective actions that may be taken by the applications. Accordingly, selection of a single application (e.g., skill) for processing an input user utterance may be a non-trivial task. CFIR tags may offer an opportunity for applications to provide a granular level of detail concerning the actions that would be taken by the application if selected for processing the input request. CFIR data may be provided as an input signal to machine learned models that may be used to select an application for processing an input request. It may be appreciated that such machine learned models may take various forms of input apart from and/or in addition to CFIR tags. For example, a machine learned model may take signals indicating past user preferences, user feedback, NLU confidence scores, CFIR tag data, etc., as input, and may be effective to determine a ranked list of candidate applications for processing an input request based on the combination of the various inputs. Additionally, through the learning process, the machine learned models may weight some inputs higher relative to other inputs in determining the appropriate application for processing a particular input request.

In some examples, an application may indicate that the application will take a first action for an input request via a CFIR tag, but upon routing the input request to the application, it is possible that the application could take a different action. In various examples, the action that is ultimately taken by the application in response to the input request may be detectable by the natural language processing system. In such examples, the natural language processing system may determine a confidence score for a particular intent and a particular application. For example, if an application often takes a different action relative to the action indicated by the application's CFIR tag for a particular intent, the application may have a relatively low confidence score for the particular intent. Such a confidence score may be used as an input to the machine learning models that control routing of input requests to applications for processing. In various examples, application developers may use CFIR tag data that over-represents the application's capabilities in order to drive increased traffic toward the application. Use of confidence scores, as described above, may be used to prevent applications from using CFIR tags to drive an increase in traffic when the application takes different actions relative to the actions indicated in the CFIR tags.

In various examples, applications may determine an action to take for processing particular request data according to an interpretation of the natural language input (represented by the request data), as determined by NLU. For example, a particular application may be selected to process request data based on a determination that the request data refers to the particular application by name. In another example, an application may evaluate its ability to process request data based on one or more intents and/or named entities determined during NLU processing of the request data. In another example, a speech processing system may determine an application that may generate a response to user request data that may be output via a TTS component of the speech processing system. Selection of the appropriate action and/or the appropriate application used to take the action and/or process the request data is non-trivial. Described herein is a speech processing routing architecture that may be used to dynamically determine the appropriate action and/or the appropriate speech processing component to process given request data. In various examples, the speech processing routing architecture may be used to determine routing destinations for request data and/or other natural language inputs for processing the inputs.

The speech processing routing architecture may facilitate the routing of request data to appropriate speech processing applications (e.g., skills) and/or other speech processing components. In various examples, the speech processing routing architecture may use machine learning models trained using features computed using user feedback data, context data, CFIR tags, and/or other predictive signals in order to determine the appropriate speech processing application and/or other speech processing component to process request data. In various examples, using machine learning models to dynamically learn routing may improve the accuracy of the routing of speech processing requests, resulting in improved user experiences and/or more pertinent responses to user request data. For example, a machine learning system may dynamically learn from contextual data and/or user feedback data to provide routing exceptions and/or routing flexibility, in contrast to a deterministic routing system.

Natural language processing may be used in a variety of contexts, including in speech processing enabled devices (e.g., devices employing voice control and/or natural language processing "voice assistants") and/or systems. Examples of natural language processing systems and/or voice-enabled personal assistants include the Siri system from Apple Inc. of Cupertino, Calif., voice-enabled actions invoked by the Google Assistant system from Google LLC of Mountain View, Calif., Dragon speech recognition software from Nuance Communications of Burlington, Mass., the Cortana system from Microsoft of Redmond, Wash., the Alexa system from Amazon.com, Inc. of Seattle, Wash., etc.

Speech processing enabled devices may include one or more microphones (e.g., far-field microphone arrays) used to transform audio into electrical signals. Natural language processing may then be performed, either locally by the speech processing enabled device, by one or more other computing devices communicating with the speech processing enabled device over a network, or by some combination of the speech processing enabled device and the one or more other computing devices. In various examples, speech processing enabled devices may include and/or may be configured in communication with speakers and/or displays effective to output information obtained in response to a user's spoken request or command, and/or to output content that may be of interest to one or more user's.

Storage and/or use of data related to a particular person or device (e.g., contextual data and/or any personal data) may be controlled by a user using privacy controls associated with a speech processing enabled device and/or a companion application associated with a speech processing enabled device. Accordingly, users may opt out of storage of personal and/or contextual data and/or may select particular types of personal and/or contextual data that may be stored while preventing aggregation and storage of other types of personal and/or contextual data. Additionally, aggregation, storage, and use of personal and/or contextual information, as described herein, may be compliant with privacy controls, even if not legally subject to them. For example, personal, contextual, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the data that may be used to optimize the machine learning techniques described herein may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

A natural language-controlled computing system may respond to user request data by outputting content and/or performing one or more other actions, such as initiating communications (e.g., synchronous phone/video calls and/or asynchronous messaging), playing music, providing information, calling a taxi, displaying an image, controlling other devices, etc. Generally, input data received by the various natural language processing systems and components described herein may comprise natural language input data. Natural language input data may be in the form of audio data representing spoken user request data (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Natural language processing systems may be configured with multiple applications (e.g., thousands, tens of thousands, or more skills) that can be used to potentially respond to a user request. Natural language processing systems may be effective to process spoken and/or textual natural language inputs to determine data representing a semantic understanding of the inputs. Applications may include any application effective to receive inputs from a natural language processing system in order to take one or more actions based on those inputs. In various other examples, skills may be a component of such applications and/or other system that interfaces with a natural language processing system. In some other examples, applications may be skills. For example, a speech processing system may include music skills, video speech processing skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of an application by a user's request may include a request that an action be taken. In at least some examples, a "skill," "skill component," "speech processing skill," "application," and the like may be software running on a computing device, similar to a traditional software application running on a computing device. Such skills may include a voice user interface in addition to or instead of, in at least some instances, a graphical user interface, smart home device interface, and/or other type of interface.

In various examples, a speech processing enabled device may include a wakeword detection component. The wakeword detection component may process audio data captured by microphones of the speech processing enabled device and may determine whether a keyword (e.g., a wakeword) is detected in the audio data. When a wakeword is detected, the speech processing enabled device may enter a "sending mode" in which audio detected by the microphones following the wakeword (e.g., data representing user request data spoken after the wakeword) may be sent to speech processing computing component(s) for further speech processing (e.g., ASR, NLU, etc.). In various examples, the wakeword detection component may be used to distinguish between audio that is intended for the speech processing system and audio that is not intended for the speech processing system.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result may determine the activation of a neuron in a subsequent layer. In addition, a bias value may be used to shift the output of the activation function to the left or right on the x-axis and thus may bias a neuron toward inactivation.

Generally, in machine learning models, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent algorithm (or gradient ascent algorithm) to incrementally adjust the weights to cause the most rapid decrease (or increase) to the output of the loss function. The method of updating the parameters of the machine learning model may be referred to as back propagation.

FIG. 1A is a block diagram illustrating an example system that may determine a routing destination for request data, in accordance with various aspects of the present disclosure. In various examples, a user 10 may send a request to a system 12. The request may be processed (e.g., by a device with which the user is interacting, such as a smart phone, tablet, and/or other computing device (not shown in FIG. 1A)) to generate data representing the request (e.g., request data 11). The request data 11 may be sent to system 12.

System 12 may be any computing device system that may be effective to route the request data 11 to one or more applications (e.g., App 1, App 2, . . . , App N) in order to process the request. For example, there may be multiple applications to which the request data 11 may be sent for processing. System 12 may determine the application or applications to which to route the request data 11 for processing. In other words, system 12 may be tasked with making a routing decision 20 for routing the request data 11 for processing. The request data 11 may represent a request for content (e.g., audio, video, software download, etc.), may be a request for an action (e.g., a request to set a smart thermostat, a request to provide an answer to a question, a request to start a timer, a request to initiate a video call, etc.), and/or any other type of request that may be processed using one or more computing devices.

In various examples, system 12 may determine an intent of the request (block 14). The intent of the request may be data representing a semantic interpretation of the user's goal and/or intention (e.g., what action the user would like to have performed). In one example, the request may be the spoken request, "What is the weather?" In such an example, system 12 may be a speech processing system and the intent determined at block 14 may be a GetWeather intent determined using ASR and NLU processing. In another example, the request data may be a programmatic request (e.g., through an application programming interface) to retrieve particular data. In such an example, system 12 may determine the type of data requested and/or one or more applications that may be able to access such data.

Prior to routing the request data 11 to an application for processing the request to return some result, the system 12 may send a CFIR 147 to various candidate applications (e.g., App 1, App 2, . . . , App N). The purpose of sending the CFIR 147 to the various candidate applications may be to determine additional information about the type of action that the various candidate applications would take if the routing decision 20 selected these applications for processing the request data 11. The CFIR 147 may comprise various data such as intent data representing the intent, slot data indicating various entities identified in the request data 11, time stamp data (and/or other context data), a request identifier, etc.

The various candidate applications (e.g., App 1, App 2, . . . , App N) may receive CFIR 147. Optionally, each candidate application may determine an action that the candidate application would take if the candidate application were to be selected to process the request data 11, on the basis of the data included in the CFIR 147. Accordingly, App 1 may determine prospective action 16a, App 2 may determine prospective action 16b, App N may determine prospective action 16n, etc. Thereafter, the candidate applications may send respective application data indicating the prospective action types (block 18) to system 12. The application data indicating the prospective action types is referred to herein as CFIR tags (e.g., CFIR tag 143 in FIG. 1B). CFIR tags may be application-specific and may indicate a type of action (and/or the specific action) that the particular application would take if the request data 11 were routed to the application for processing. Examples of action types may be metadata indicating that the application will initiate playback of audio, metadata indicating that the application will initiate a dialog, metadata indicating that the application will generate an error message, metadata indicating playback of video, metadata indicating that the application will generate a spoken response (output via TTS), etc.

For example, the user 10's request may be "Play Frozen." App 1 may determine that, if selected to process the request data 11, that App 1 would initiate audio playback of an album titled "Frozen" using an audio player. Accordingly, a CFIR tag generated by App 1 may indicate this prospective action. App 2 may determine that, if selected to process the request data 11, that App 2 would initiate a dialog session to disambiguate whether the user would like to play a movie entitled "Frozen" or a soundtrack entitled "Frozen." App 3 may indicate that App 3 would generate an error message explaining that the application is unable to process the request, and so on.

System 12 may receive such CFIR tag data and may use such data as a signal to determine where to route the request data 11 for processing. In various examples, the CFIR tag data may be input, along with various other data (e.g., NLU output data, confidence scores, context data, device ID data, user satisfaction data, etc.) into a machine learned model that is configured to make a routing decision 20 based on the various inputs. Thereafter, system 12 may make a routing decision 20 and may route the request data 11 to one or more of the applications for processing. In the foregoing examples, the CFIR tag data may allow the system 12 to make more informed routing decisions for requests on the basis of the actions that the applications are able to take in response to receipt of the request. In many cases, such informed routing decisions may lead to increased user satisfaction with the system 12.

Figure 1B:
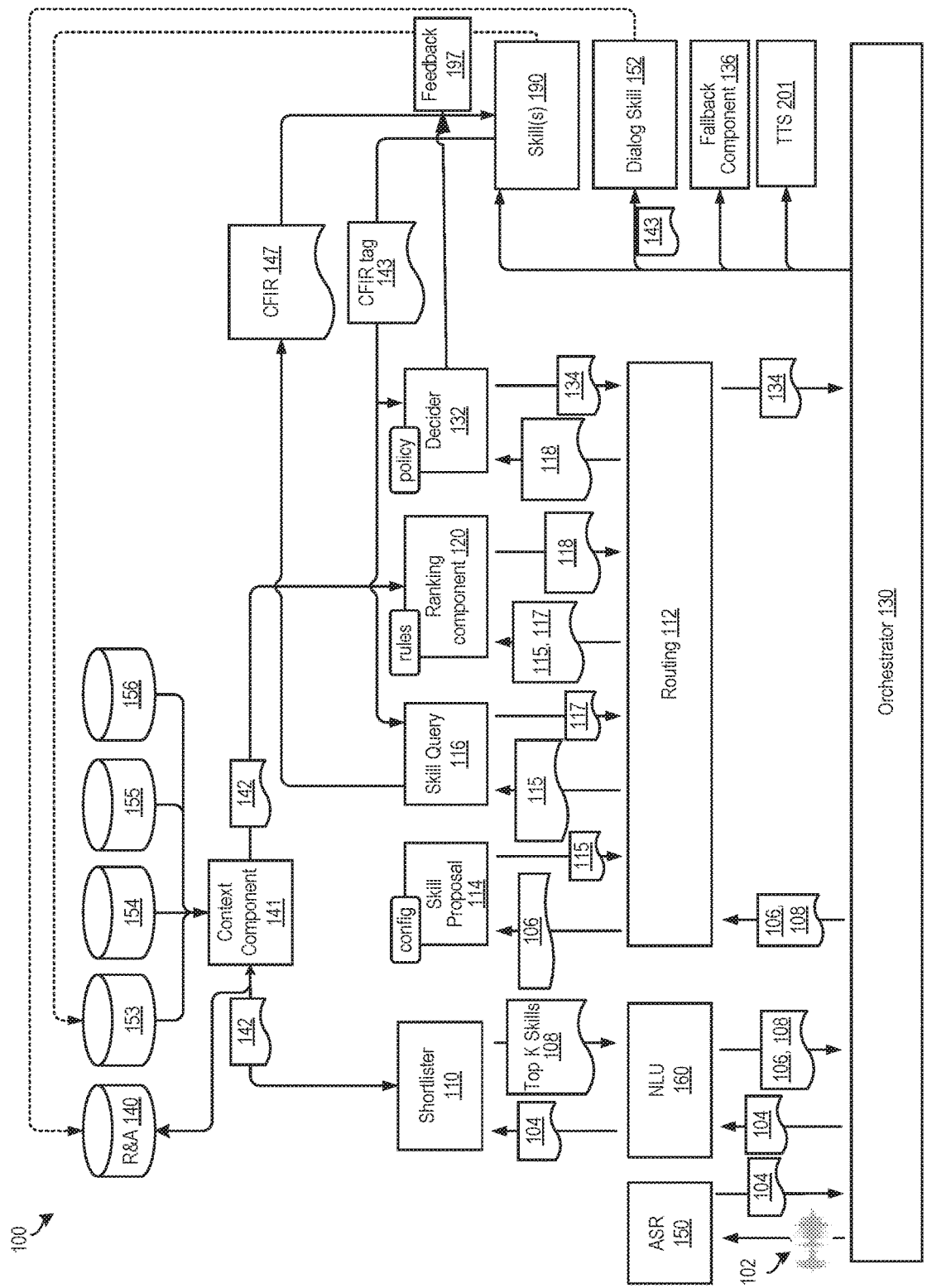
FIG. 1B is a block diagram illustrating an example speech processing routing architecture, according to various embodiments of the present disclosure.

FIG. 1B is a block diagram illustrating an example natural language processing system 100, according to various embodiments of the present disclosure. In various examples below, skills may be referred to, however the techniques described herein with respect to skills are applicable to any natural language processing applications. A system according to the present disclosure may operate using various components as described in FIG. 1B. The various components illustrated FIG. 1B may be located on the same or different physical devices. Communication between various components illustrated in FIG. 1B may occur directly or across a network. A speech processing-enabled device may capture audio using an audio capture component, such as one or more microphone(s). The speech processing enabled device may send audio data 102 (e.g., corresponding to request data) to an orchestrator 130 of the natural language processing system 100. The speech processing enabled device may also send metadata (e.g., including device identifiers, device type data, contextual data, IP address data, room location data, etc.) to the orchestrator 130. The components depicted in FIG. 1B, including components of a speech processing system may be generally referred to as spoken language processing components, a natural language processing system 100 a spoken language processing system, speech processing components, and/or a speech processing routing system. Additionally, in various examples, the components depicted in FIG. 1B may process written input (e.g., text data) in addition to spoken input.

Upon receipt by the natural language processing system 100, the audio data 102 may be sent to an orchestrator 130. The orchestrator 130 may include memory and logic that enables the orchestrator 130 to initiate a dialog session and to transmit various pieces and forms of data to various components of the system, as described in further detail below.

The orchestrator 130 may send the audio data 102 to an ASR component 150 (e.g., a speech recognition component). The ASR component 150 may transcribe the audio data 102 into one or more hypotheses representing speech contained in the audio data 102. The ASR component 150 interprets the speech in the audio data based on a similarity between the characteristics of the audio data corresponding to the speech and pre-established language models. For example, the ASR component 150 may compare the audio data 102 with models for sounds (e.g., subword units such as phonemes) and sequences of sounds to identify words that match the sequence of sounds in the speech represented in the audio data 102. The ASR component 150 may send text data 104 and/or other ASR output data generated thereby to orchestrator 130 that may, in turn, send the text data 104 (and/or other ASR output data) to natural language component 160. As previously described, the text data 104 and/or other ASR output data may include one or more ASR hypotheses. The text data 104 and/or other ASR output data may include a top scoring hypothesis of the speech represented in the audio data 102 or may include an N-best list including a group of hypotheses of the speech represented in the audio data 102, and potentially respective scores ASR processing confidence scores. As previously described, in some other examples, the ASR component 150 (and/or other components of the natural language processing system 100) may generate other metadata associated with the request such as an overall utterance confidence score, per-word (e.g., per token) confidence scores for the utterance, utterance duration, stream duration (e.g., duration of the stream of audio data from speech processing enabled device to natural language processing system 100), a number of tokens output by ASR, etc.

The natural language component 160 attempts to make a semantic interpretation of the phrases or statements represented in the text data (and/or other ASR output data) input therein. That is, the natural language component 160 determines one or more meanings associated with the phrases or statements represented in the text data 104 and/or other ASR output data based on individual words represented in the text data 104 (and/or other ASR output data). The natural language component 160 interprets a text string to derive an intent of the user (e.g., an action that the user desires be performed) as well as pertinent pieces of information in the text data (and/or other ASR output data) that allow a device (e.g., the speech processing enabled device, the natural language processing system 100, a computing device(s) implementing a speech processing application, etc.) to complete the intent. For example, if the text data 104 and/or other ASR output data corresponds to "Set temperature to 74 degrees," the natural language component 160 may determine the user intended to invoke a climate intent with a target temperature value slot of 74 degrees Fahrenheit. As previously described, in addition to the NLU intent and slot data, the natural language component 160 may generate other metadata associated with the request (e.g., with the audio data 102). Examples of such metadata include, an NLU confidence score for the top intent hypothesis, NLU classification type (e.g., statistical vs. deterministic), NLU slot presence (e.g., data indicating that a particular slot was present), NLU confidence score for the overall top hypothesis (e.g., including the relevant speech processing application, intent, and/or slot), entity recognition confidence scores, entity recognition match types (e.g., exact match, prefix match, suffix match, etc.), etc. Herein, the data output by the natural language component 160 (depicted in FIG. 1B as "NLU 160") is referred to as NLU output data 106.

Natural language component 160 may send the text data 104 (and/or other ASR output data) and/or some of NLU output data 106 (such as intents, recognized entity names, slot values, etc.) to a shortlister 110. The shortlister 110 may comprise one or more machine learning models that may be effective to predict a subset of speech processing applications that are most likely to be able to correctly process the request data, based on the input of the text data 104 (and/or other ASR output data) and/or the NLU output data 106. In addition, the shortlister 110 may call the ranking and arbitration component 140 to request features pre-computed by the ranking and arbitration component 140 according to features used as inputs by the machine learning models of shortlister 110. As previously described, the shortlister 110 may define source data used to compute the features and/or may specify functions used to generate the features from the source data (e.g., formulae and/or functions) prior to runtime processing of request data. The ranking and arbitration component 140 may precompute the features according to the specified feature definitions supplied by shortlister 110 and by the other components of natural language processing system 100 and may store the precomputed features in memory. Ranking and arbitration component 140 may generate indexes that may be used to retrieve the precomputed features during runtime (e.g., through an API). Accordingly, during runtime processing, shortlister 110 may retrieve the precomputed features from ranking and arbitration component 140 used by shortlister 110 to generate the subset of speech processing applications that are most likely to be appropriate to process the current request data. Accordingly, shortlister 110 may send the top K skills 108 to natural language component 160. Natural language component 160 may thereafter perform skill-specific NLU processing for the skills in the top K skills 108 to determine skill-specific intents, slots, and/or named entities. NLU output data 106 may include such skill-specific data (e.g., skill-specific N-best hypotheses). In some examples, generating pre-computed features based on user feedback data by ranking and arbitration component 140 may generate increasingly contextually rich feature data that may be used to train various machine learning models used to route speech processing request data (e.g., ranking component 120, shortlister 110, etc.).

Ranking and arbitration component 140 may communicate with various systems in order to obtain source data used to precompute features. In an example embodiment, ranking and arbitration component 140 may receive source data used to precompute features that is generated by other speech processing components (e.g., natural language component 160, ASR component 150, etc.). For example, NLU intent data may be used to pre-compute features for some downstream speech processing component (e.g., ranking component 120). Ranking component 120 may be "downstream" in the sense that processing by natural language component 160 occurs prior to processing by ranking component 120 during a given dialog session. In another example, ranking and arbitration component 140 may communicate with feedback storage 153 to receive user feedback data (e.g., explicit and/or implicit user feedback related to user satisfaction with processing of one or more request data) used as source data to precompute features. In various examples, the user feedback data may be user-specific and/or device specific and may indicate whether a user was satisfied or not satisfied with a particular interaction with natural language processing system 100. Additionally, ranking and arbitration component 140 may communicate with endpoint context system 154, which may provide context data at the conclusion of a user interaction with the natural language processing system 100. In another example, ranking and arbitration component 140 may communicate with speech processing application data 156 to determine information from the speech processing application regarding past interactions with the speech processing application and/or data acquired by the speech processing application. Additionally, ranking and arbitration component 140 may communicate with other data sources 155, as new services are added and/or as new data types that may be useful for routing prediction are made available. In addition to ranking and arbitration component 140 using context data 142 to precompute features used by various machine learning models of the routing architecture of the natural language processing system 100, a context system 141 may receive the context data 142. The context system 141 may provide the context data directly to both ranking and arbitration component 140 as well as to various components of the routing architecture of natural language processing system 100. For example, the context system 141 may send context data 142 to shortlister 110 and/or ranking component 120 in order to determine a shortlist of skills 190 for particular request data and/or in order to rank the shortlisted speech processing applications.

NLU output data 106 and top K skills 108 may be sent by natural language component 160 to orchestrator 130. Orchestrator 130 may send the top K skills 108 and the NLU output data 106 to routing component 112. Routing component 112 may send the top K skills 108 and NLU output data 106 to skill proposal component 114. Skills 190 may subscribe to particular intents using skill proposal component 114. Accordingly, skill proposal component 114 may receive the NLU output data 106 and may determine whether any of the included intents correspond to one or more of skills 190 that have registered for the particular intent. If so, skill proposal component 114 may generate candidate data comprising <Intent, Skill> candidate pairs 115. In various examples, the candidate pairs 115 may further include slot data identifying entities included in the request data that have been recognized using named entity recognition and/or entity resolution. The candidate pairs 115 may be sent to routing component 112 and may be sent by routing component 112 to skill query service 116. Skill query service 116 comprises an API through which skills 190 may "opt out" of particular requests. For example, a skill 190 may comprise a video playback skill. Accordingly, the skill 190 may register with skill query service 116 to indicate that only requests made on a device with a display screen should be routed to the particular skill 190. In addition, skills 190 may communicate availability information, pricing information, and/or other structured descriptions of how and under what circumstances (e.g., determined using context data) the skill 190 can fulfill a request included in the current request data.

Skill query service 116 provides a capability for speech processing applications (e.g., skills) to provide signals to ranking component 120 that indicate how well the particular speech processing application may handle the current request data. For example, skill query service 116 may send a "Can fulfill intent request" (CFIR) 147 to candidate skills (e.g., top K skills 108 output by shortlister 110). CFIR 147 may include intent data and/or slot data from the NLU output data 106. Each of the candidate skills may respond to the CFIR 147 with CFIR response data indicating whether the skills are able to process the current request data. Additionally, one or more of the candidate skills may respond to the CFIR 147 with CFIR tag 143, which may be metadata indicating an action and/or type of action that the particular candidate skill will perform if the request data is routed to the particular candidate skill for processing.

As previously described, the various candidate skills may evaluate an ability to fulfill a current request based on a determination as to whether the skill is effective to process the intent data and/or recognize the slot data that is provided with the CFIR 147. Additionally, the skill may include a CFIR tag 143 with the response data that indicates a particular action that the skill would take if the skill is ultimately selected for processing the current request. For example, the CFIR tag 143 may be metadata indicating that the skill is able to process the intent successfully. In another example, the CFIR tag 143 may indicate that the skill intends to engage the user in a dialog in response to being selected to process the current request. In another example, the CFIR tag 143 may indicate that the skill intends to initiate streaming of video and/or audio (e.g., initiate video playback and/or audio playback) in response to being selected to process the current request. In another example, the CFIR tag 143 may indicate that the skill intends to render a spoken response (e.g., audio data output by a TTS component) to the user in response to being selected to process the current request. In another example, the CFIR tag 143 may indicate that the skill intends to change a setting of a device in response to being selected to process the current request. For example, the skill may control a light switch, a thermostat, an appliance, an automated shutter, a vehicle, etc. In still another example, the CFIR tag 143 may indicate that the skill intends to output a semantically relevant error response related to the current request. In still other examples, CFIR tag 143 may indicate that there is a monetary amount associated with the skill's response. In some further examples, CFIR tag 143 may indicate that the action generated by the skill requires an account sign-up, user authentication, etc. In another example, CFIR tag 143 may indicate that an account generating the input request is registered with the particular skill.

In various examples, skill query service 116 may generate a signal 117 representing the CFIR tag 143 and/or the candidate skills' responses to the CFIR 147. The ranking component 120 may use such input signals (e.g., signal 117) during ranking of the candidate pairs 115. Skill query service 116 may send a signal 117 indicating what skills can fulfill a particular request (and/or what skills are unable to fulfill the request), and/or how well the skill is able to fulfill the request. The signal 117 may be sent to routing component 112. Routing component 112 may send the signal 117 along with the candidate pairs 115 to a ranking component 120. In various examples, CFIR tag 143 may indicate situations in which a skill may opt out of processing a particular request (e.g., if the device sending the request data does not include a display screen, etc.). Accordingly, in at least some examples, CFIR 147 may include context data, such as a device ID, to indicate the context of the speech processing enabled device from which the request data was received.

For example, a particular skill may determine whether or not the intent included in the CFIR 147 is an intent that the skill is effective to process and may provide CFIR tag 143 to ranking component indicating whether the skill is able to process the relevant intent. Ranking component 120 may, in turn, use the CFIR tag 143 (and/or data representing the CFIR tag 143) as an input to one or more machine learning models used to rank the list of candidate pairs 115. In some examples, the CFIR tag 143 may also be sent to decider component 132 and decider component 132 may generate plan data 134 based at least in part on the CFIR tag 143. In some further examples, the CFIR tags 143 received from various candidate skills may be batched and/or used to train and/or re-train machine learning models of shortlister 110, ranking component 120, decider component 132, etc.

For example, there may be low confidence in ASR output data comprising the text: "turn off timer." NLU may generate intent data comprising a "turn off timer" intent, with high confidence. CFIR 147, including the "turn off timer" intent, may be sent to a skill 190 controlling a timer. The skill 190 may send CFIR tag 143 to skill query service 116 indicating that the skill 190 will toggle a setting of a timer to turn off the timer in response to the "turn off timer" intent.

Ranking component 120 may include one or more statistical machine learning models effective to rank the candidates included in candidate pairs 115. In order to rank the candidate pairs 115, ranking component 120 may generate confidence scores for each corresponding candidate pairs 115. A confidence score may indicate that the corresponding skill 190 and/or intent of the candidate pair is appropriate to process the request. Ranking component 120 may compute features using the candidate pairs 115 and signal 117 (representing CFIR tag 143 and/or skill responses to CFIR 147) in order to predict the ranking of the skills 190 included in the candidate pairs 115. The features computing during processing of the request data (sometimes referred to as "runtime features") may comprise a feature representation of the list of candidate pairs 115 and/or a representation of the signal 117. Additionally, ranking component 120 may query ranking and arbitration component 140 for precomputed features that have been defined for use by ranking component 120. As previously described, the precomputed features may be determined based on contextual data, user feedback data, past usage data, skill data, previous rankings of ranking component 120, etc. Additionally, ranking component 120 may compute runtime features using context data 142, user feedback data from feedback storage 153, and/or other data sources. In various examples, the loss function for the machine learning models of ranking component 120 may optimize based on user satisfaction scores computed using user feedback data from feedback storage 153.

Ranking component 120 may generate a ranked list 118 of the candidate skills indicated in candidate pairs 115. In at least some examples, the ranking component 120 may use a deep neural network as a machine learning model for determining the ranked list 118. Inputs to the machine learning models of the ranking component 120 may include NLU output data 106, signal 117 (comprising CFIR tag 143), context data, data representing enabled skills (e.g., for the speech processing enabled device and/or account that received the input request data/utterance), NLU confidence data, ASR confidence data, etc.

In addition, ranking component 120 (and/or some other natural language processing system 100 component, such as decider component 132) may determine one or more rules that may override the ranked list 118 such that a lower ranked skill and/or a skill that is not one of the candidate pairs 115 is selected for processing the request data. For example, a dynamic routing adjustment may be inserted in order to emphasize a newly-implemented skill 190. The dynamic routing adjustment may divert some speech processing requests (e.g., a percentage of relevant request data) to the newly-implemented skill 190 in spite of the newly implemented skill 190 not being the top result (or potentially even among the results) of ranked list 118. Similarly, the newly-implemented skill 190 may be inserted among the top K skills 108 determined by the shortlister 110. Once a sufficient amount of user feedback for the newly-implemented skill 190 has been obtained, the dynamic routing adjustment may be removed. The machine learning models of the ranking component 120 and shortlister 110 may be retrained based on the newly-implemented skill and based on the user feedback the newly-implemented skill 190 has received as a consequence of the dynamic routing adjustment. Accordingly, thereafter the shortlister 110 may include the newly-implemented skill 190 in the top K skills 108 as appropriate for a given incoming request. Similarly, ranking component 120 may rank the newly implemented skill 190 as appropriate for processing the request.

In various examples, a decider component 132 may receive the ranked list 118 of candidates (including any candidates selected via a dynamic routing adjustment, as described above). In some examples, the decider component 132 may act as a check on the results of the ranking component. For example, there may be scenarios in which statistical models of the ranking component 120 may determine that a request should be routed to a particular skill to perform a particular action. However, there may be risks associated with performance of the action or with routing the request data to the skill for processing. For example, a user may say the phrase "turn on the oven." The ranking component may determine that the top-ranked result is a control skill that is effective to process the request data to turn on the oven. However, context data 142 may indicate that the user is not currently at home. Accordingly, turning on the oven may currently be unsafe, and the statistical result of the ranking component 120 may not be a safe or an intended result according to a particular policy. The policy may be a set of deterministic rules used to provide safety boundaries on sensitive requests.

Accordingly, the decider component 132 may compare the results of the ranking component 120 to one or more predefined policies that may indicate whether or not request data should be sent to top-ranked result of the ranking component 120 or whether some other action should be taken. For example, if the phrase "Arm the security system" is interpreted by ASR/NLU as the current utterance, the decider component may comprise a policy indicating that the ranking component results should be ignored and that the utterance should always be passed to a security system skill used to control security system hardware.

In another example, a decider component may determine a class of the utterance. For example, if the utterance is classified as belonging to a sensitive class the speech processing system may use a dialogue speech processing application and/or TTS to confirm the user's intention prior to routing the request data to the top-ranked result of the ranker component. For example, user request data may be a request to "unlock the front door." The top-ranked result of the ranking component may be routing to a skill that controls the lock on the front door. However, requests to unlock doors may be classified by the decider component 132 as a sensitive request. Accordingly, the receipt of the sensitive request may trigger a confirmation request output by TTS prior to routing the request data to the top-ranked skill. For example, the confirmation request may be "Did you want me to unlock the front door?" Decider component 132 may output plan data that comprises a routing plan 134 for processing the request data. The routing plan 134 may define a target skill 190 to process the request data. As described above, the target skill 190 may be selected as the top-ranked hypothesis determined by the ranking component 120. In some other examples, the decider component 132 may select a target skill 190 based on a policy and/or based on a class of the request data, as described above. In some examples, the ranking component 120 may determine that two different skills are equally applicable for processing the request data.

In such examples, the decider component 132 may determine that disambiguation should occur. Accordingly, the routing plan 134 may include sending the request data to a dialog skill 152 that may output (via TTS) one or more questions (e.g., a disambiguation request) used to prompt the user to disambiguate between the two equally likely (or approximately equally likely) interpretations of the request data. For example, it may be unclear, based on a user's request, whether the user intended to invoke a movie playback skill or a music playback skill, as a movie and a soundtrack for the movie may be identified using the same name. Accordingly, the decider component 132 may determine that the top two hypotheses of ranking component 120 are equally likely (or approximately equally likely) and may determine that a question should be asked to disambiguate between the two possible actions. Accordingly, the routing plan 134 may route the request data to the dialog skill 152, and the dialog skill 152 may inquire whether the user intended to play the movie or the soundtrack.

In another example, the decider component 132 may determine that the user was not satisfied with the top hypothesis of the ranking component 120 (e.g., due to explicit or implicit feedback received from the user in response to taking an action associated with the top ranking component 120 hypothesis). Accordingly, the decider component 132 may determine that the routing plan 134 should be to determine the second highest ranked hypothesis of the ranking component 120. The routing plan 134 may be sent to the fallback component 136. In various examples, the fallback component 136 may determine a list of the top hypotheses, top intents, and/or top ASR text interpretations from the previous turn of dialog, and may select a fallback option for processing the request data from the lists.

The natural language processing system 100 may also include a TTS component 201 that synthesizes speech (e.g., generates audio data) corresponding to text data input therein. Accordingly, one or more of skills 190, dialog skill 152, fallback component 136, ASR component 150, and/or orchestrator 130. The TTS component 201 may perform speech synthesis using one or more different methods. In one method of synthesis called unit selection, the TTS component 201 matches text data against one or more databases of recorded speech. Matching units are selected and concatenated together to form audio data. In another method of synthesis called parametric synthesis, the TTS component 201 varies parameters such as frequency, volume, and noise to create an artificial speech waveform output. Parametric synthesis uses a computerized voice generator, sometimes called a vocoder.

Figure 2:
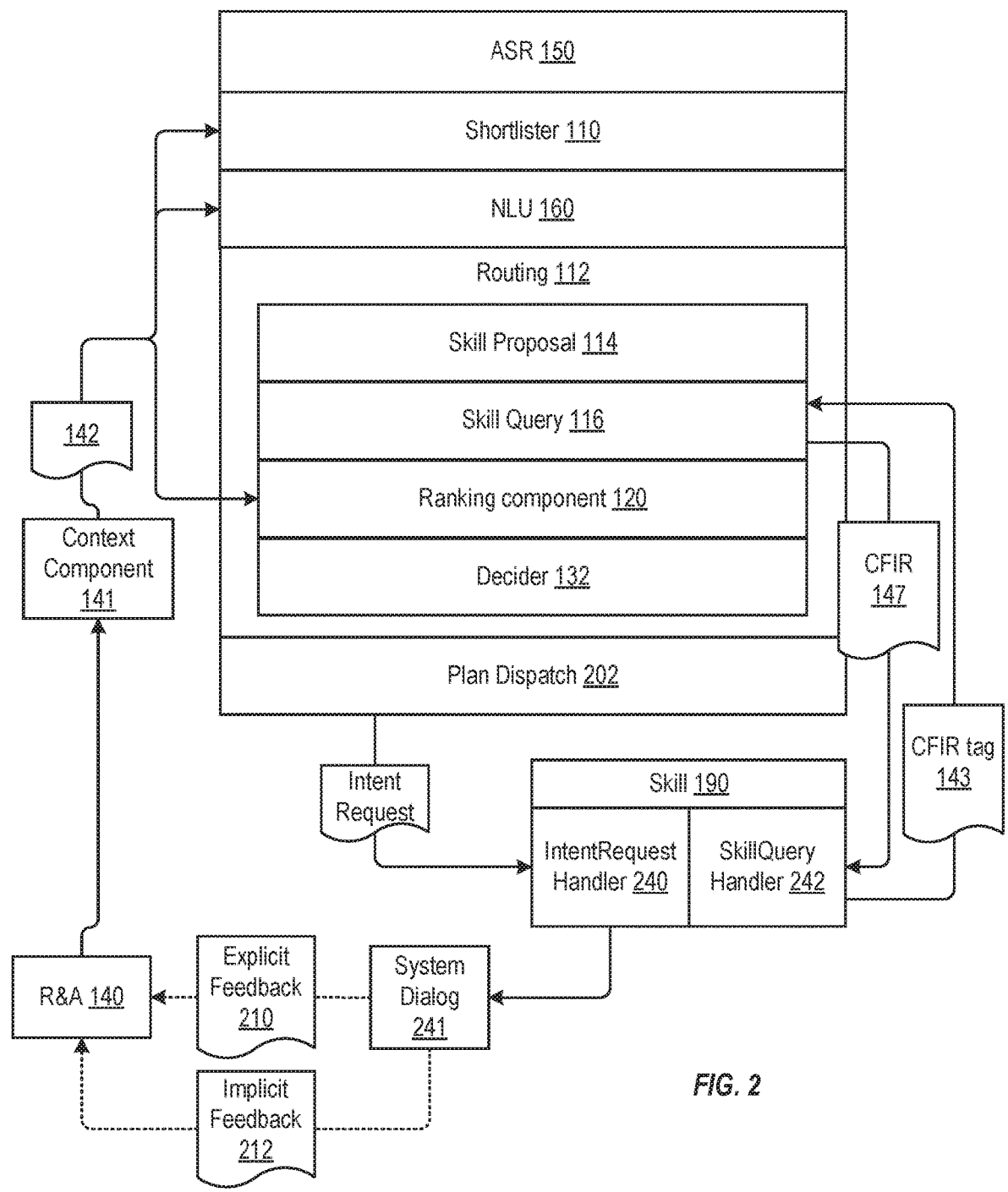
FIG. 2 is another block diagram illustrating an example speech processing flow for processing request data, according to various embodiments of the present disclosure.

FIG. 2 is another block diagram illustrating an example speech processing flow for processing request data, according to various embodiments of the present disclosure. FIG. 2 depicts the various components of the natural language processing system 100 oriented in a stack. Request data processing generally proceeds from the top of the diagram to the bottom. For example, audio data representing request data may be received by ASR component 150. ASR component 150 may generate one or more text hypotheses representing the utterance/other natural language input. The ASR hypotheses may be sent to the shortlister 110 and/or the natural language component 160. In various examples, the shortlister 110 may be considered part of the natural language component 160. The shortlister 110 may determine a subset of skills that are most likely to be appropriate to process the current request data. Shortlister 110 may send the top K skills to natural language component 160. Natural language component 160 may thereafter perform skill-specific NLU processing for the skills in the top K skills 108 to determine skill-specific intents, slots, and/or named entities. NLU output data may include such skill-specific data (e.g., skill-specific N-best hypotheses). As previously described, in various examples, shortlister 110 and natural language component 160 may use pre-computed features determined by ranking and arbitration component 140 as well as context data 142 received from context system 141 in order to generate their respective outputs/predictions.

NLU output data and the top K skills may be sent to routing component 112. Routing component 112 may send the top K skills and NLU output data to skill proposal component 114. Skills 190 may subscribe to particular intents using skill proposal component 114. Accordingly, skill proposal component 114 may receive the NLU output data and may determine whether any of the included intents correspond to one or more of skills 190. If so, skill proposal component 114 may generate candidate data comprising <Intent, Skill> pairs. The candidate pairs may be sent to routing component 112 and may be sent by routing component 112 to skill query service 116. Skill query service 116 may send CFIR 147 comprising a request for a skill 190 to determine the skill 190's ability to handle the current request data. The CFIR 147 may include intent data, slot data, and/or other NLU output data that the skill 190 may use to determine the skill 190's ability to process the request data.

In addition, skills 190 may generate CFIR tag 143 that indicates an action that the skill would perform if the skill 190 were to be selected by the routing component 112 for processing the current request data. In various examples, the CFIR tag 143 may communicate availability information, pricing information, and/or other structured descriptions of how and under what circumstances the skill 190 can fulfill a request included in the current request data. Additionally, the CFIR tag 143 may indicate the type of action that the skill 190 would perform in response to the intent data and/or the slot data indicated in the CFIR 147. For example, the CFIR tag 143 may indicate that the skill will generate an error message that is semantically relevant to the current request. In another example, the CFIR tag 143 may indicate that the skill will initiate playback of a media file in response to the current request. In another example, the CFIR tag 143 may indicate that the skill will initiate a dialog session in response to the current request. The foregoing examples of types of actions that a skill may undertake and/or indicate using a CFIR tag 143 are for illustrative purposes. Other actions and/or information may be indicated using a CFIR tag 143.

Skill query service 116 may send a signal representing CFIR tag 143 and/or skill data indicating whether skills can fulfill a particular request (and/or what skills are unable to fulfill the request) to routing component 112. Routing component 112 may send the signal along with the candidate pairs to a ranking component 120. In some examples, skills 190 may send skill context data to skill query service 116 to indicate situations in which a skill may opt out of processing a particular request (e.g., if the device sending the request data does not include a display screen, etc.). In various examples, the skill context data may be skill and/or request specific context data. In various examples, the skill context data may be sent as CFIR tag 143.

Ranking component 120 may receive the candidate pairs and may use context data 142 and/or precomputed features generated by ranking and arbitration component 140 to generate a ranked list of the candidate pairs. In various examples, a decider component 132 may receive the ranked list of candidates from the ranking component 120. Decider component 132 may determine whether there are any applicable policies to be applied based on the ranked list of candidates and/or based on the particular request. Decider component 132 may generate plan data and may send the plan data to a plan dispatch component 202 that may send an intent request to the appropriate skill 190.

The skill 190 may comprise an intent request handler 240 and/or a skill query handler 242. The intent request handler 240 may process the intent received from the routing component 112. Similarly, the skill query handler 242 may process the request data according to the particular service of the skill that has been requested.

In at least some examples, and in accordance with the plan data generated by decider component 132, a system dialog 241 may be initiated in order to solicit feedback from the user (e.g., after the skill 190 has completed processing the request data). In another example, the system dialog 241 may output a question used to disambiguate between different skills and/or intents. The system dialog 241 may receive the user's response and may generate explicit feedback 210 (e.g., where the user responds to a question asking whether the user was satisfied with the experience) and/or implicit feedback 212 (e.g., determining that the user interrupted playback/dialog in order to rephrase the request). As previously described, the implicit feedback 212 and/or explicit feedback 210 may be used by ranking and arbitration component 140 to generate precomputed features that may, in turn, be used by various machine learning models of the natural language processing system 100.

Figure 3:
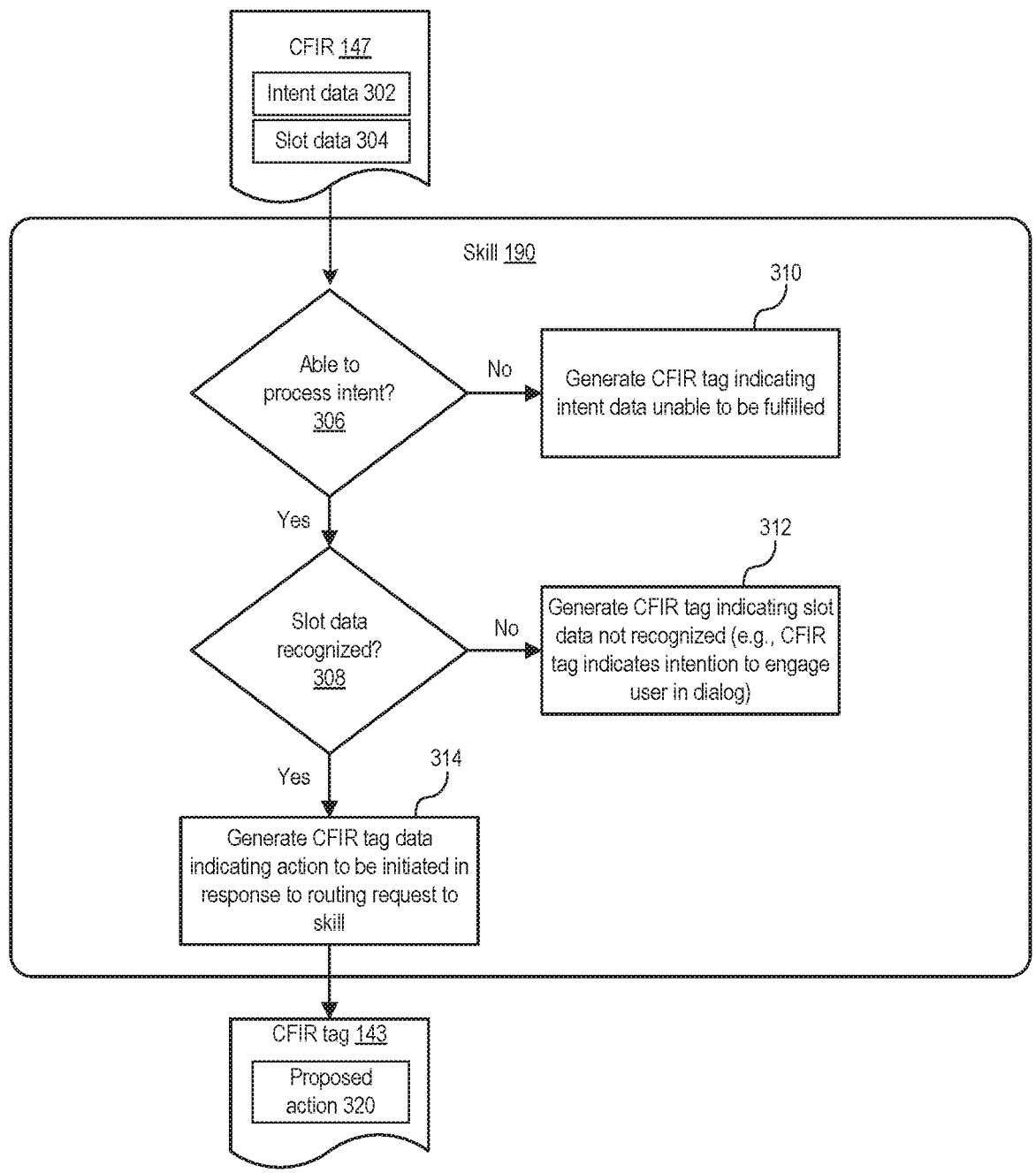
FIG. 3 is a block diagram illustrating an example process for generating CFIR tag data, in accordance with various embodiments described herein.

FIG. 3 is a block diagram illustrating an example process for generating CFIR tag data, in accordance with various embodiments described herein. CFIR 147 may be received and may include intent data 302 and/or slot data 304. For example, a user may state "Computer, play the song The Curse of an Aching Heart by Henry Fink." NLU component 160 may determine the <PlayMusicIntent> as intent data 302 with the slot data 304 {Song Name}: "The Curse of an Aching Heart" and {Artist Name}: "Henry Fink."

In various examples, CFIRs (e.g., CFIR 147) may include other types of data in addition to intent data 302 and/or slot data 304. For example, CFIRs may indicate a current device state (e.g., data indicating that audio playback is currently occurring, that there is currently video being displayed, that the device is in a low-power state, etc.). In another example, CFIRs may indicate a user ID associated with the input request. There may be other example process flows for determining how to respond to a CFIR apart from what is specifically shown and described with respect to FIG. 3. Accordingly, FIG. 3 depicts one possible implementation of a workflow for a skill generating a response to a CFIR, however other processes are possible, depending on the desired implementation.

In various examples, the inputs to a given skill in a CFIR may be similar to the inputs to a skill when a skill is selected for processing an input request. This may be intentional, from a design standpoint, as providing the skill with as much information as possible provides the skill with the opportunity to evaluate the input request and determine the response that the skill would take if selected for processing the request. However, some data may be generated by the natural language processing system 100 after receiving the CFIR tag 143 that may ultimately be sent to a skill selected for processing an input request. Accordingly, CFIRs sent to a skill may not be identical to requests to process an intent when sent to the same skill. However, CFIRs may include instructions instructing the skill not to perform any on the CFIR data that would be apparent to a user (and/or that would change a state related to the user and/or the device receiving the input request), whereas requests to process an input request may not include such instructions.

Prior to selecting a particular skill for processing and prior to routing the request to a particular skill for processing, skill query service 116 (not shown in FIG. 3) may send CFIR 147 including intent data 302 and slot data 304 to each candidate skill (e.g., the top K skills for the current request data as determined by shortlister 110).

For a given skill 190, the skill 190 may make a determination if the skill 190 is able to process the intent (at decision step 306). For example, the skill 190 may perform a lookup to determine if the intent data 302 <PlayMusicIntent> is a defined intent in an intent library accessible by skill 190. If not, processing by skill 190 may proceed to block 310, at which CFIR tag data indicating that the intent data (or the request data more generally) is unable to be fulfilled by the particular skill 190 may be generated.

Conversely, if a determination is made (at decision step 306) that the skill 190 is able to process the intent, skill 190 may determine (at decision step 308) if slot data 304 included in CFIR 147 is recognized. For example, the skill 190 may search a data structure (e.g., a knowledge graph) to determine whether the slot data represents an entity known to the skill 190. If not, processing by skill 190 may proceed to block 312, at which CFIR tag data indicating that the slot data is not recognized may be generated. In various examples, when slot data is not recognized, the CFIR tag data may indicate an intention of the skill 190 to initiate a dialog session to clarify the slot data.

Conversely, if a determination is made (at decision step 308) that the slot data is recognized, skill 190 may generate slot data indicating an action to be initiated by the skill 190 in response to selection of the skill 190 for processing the request data (e.g., for routing the request data including intent data 302 and slot data 304) to the skill 190 (block 314). For example, skill 190 may determine that the slot data indicating {Song Name}: "The Curse of an Aching Heart" and {Artist Name}: "Henry Fink" are recognized in a gazetteer, library, and/or database accessible by skill 190. Skill 190 may send CFR tag 143 comprising metadata indicating that the skill would initiate playback of the song "The Curse of an Aching Heart" by the artist "Henry Fink" in response to being selected for processing the request data. In this example, the skill 190 may be a music player skill. Skill 190 may thereafter send the CFIR tag 143, including the proposed action 320, to the natural language processing system 100. The CFIR tag 143 may be sent as a signal (e.g., signal 117 from FIG. 1B) to the ranking component 120 and may be used by one or more machine learned models of ranking component 120 to determine a ranked list of skills 190 for processing of the request data.

Figure 4:
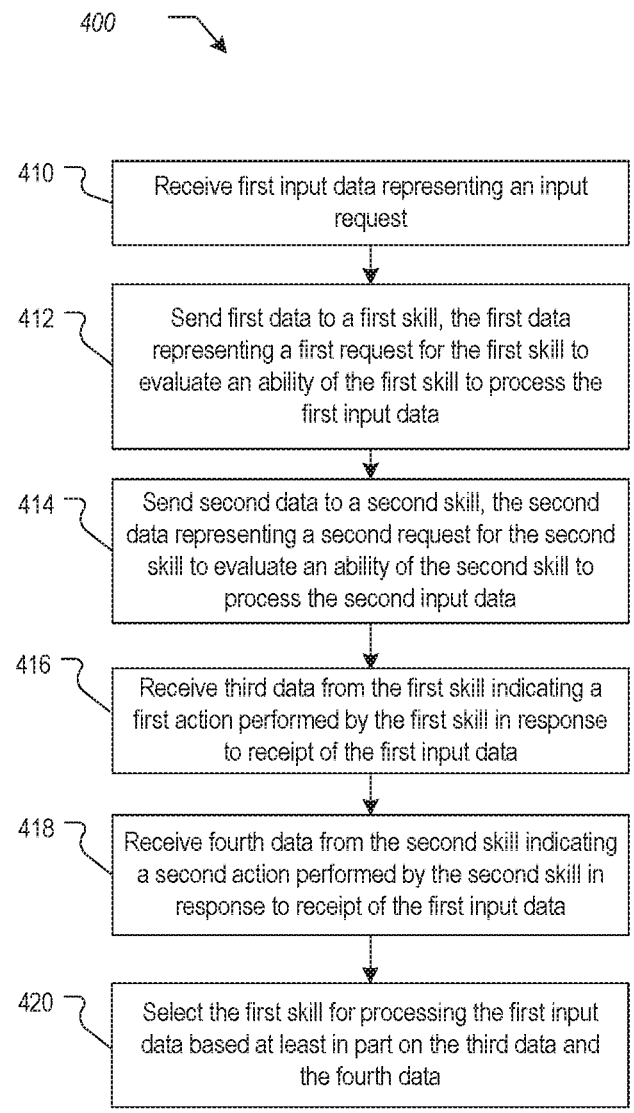
FIG. 4 depicts a flow chart showing an example process for using CFIR tag data to select an application for processing request data, in accordance with various aspects of the present disclosure.

FIG. 4 depicts a flow chart showing an example process 400 for using CFIR tag data to select a skill for processing request data, in accordance with various aspects of the present disclosure. Those portions of FIG. 4 that have been previously discussed in reference to FIGS. 1-3 may not be described again for purposes of clarity and brevity. The actions of the process 400 may represent a series of instructions comprising computer-readable machine code executable by one or more processing units of one or more computing devices. In various examples, the computer-readable machine code may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 400 may begin at action 410, at which first input data may be received that represents an input request. In various examples, the first input data may represent user input text and/or speech comprising a command or request to be executed by natural language processing system 100 and/or a skill configured in communication with natural language processing system 100.

Process 400 may continue at action 412, at which first data may be sent to a first skill. The first data may represent a first request for the first skill to evaluate an ability of the first skill to process the first input data. In various examples, the first data may be a CFIR (e.g., CFIR 147). Process 400 may continue to action 414, at which second data may be sent to a second skill. The second data may represent a second request for the second skill to evaluate an ability of the second skill to process the first input data. In various examples, the second data may be another CFIR (e.g., CFIR 147). Any number of CFIRs may be sent (e.g., one to each of the top K candidate skills determined by shortlister 110).

Process 400 may continue at action 416, at which third data may be received from the first skill indicating a first action performed by the first skill in response to receipt of the first input data. At action 416, the first skill may determine the action that the first skill would take if selected for processing the current input request. The action may be determined based on intent data, slot data, and/or context data included with and/or otherwise associated with the CFIR request (e.g., the first data of action 412). The third data may be a CFIR tag comprising metadata indicating the action that would be taken by the first skill if the first input data is routed to the first skill for processing the first input data.

Similarly, at action 418, fourth data may be received from the second skill indicating a second action performed by the second skill in response to receipt of the first input data. At action 418, the second skill may determine the action that the second skill would take if selected for processing the current input request. The action may be determined based on intent data, slot data, and/or context data included with and/or otherwise associated with the CFIR request (e.g., first data of action 412). The fourth data may be a CFIR tag comprising metadata indicating the action that would be taken by the second skill if the first input data is routed to the second skill for processing the first input data.

Process 400 may continue at action 420, at which the first skill may be selected for processing the first input data based at least in part on the third data and the fourth data. In various examples, the third and fourth data (e.g., CFIR tags for the first skill and second skill, respectively) may be sent to ranking component 120. Ranking component 120 may use the information in the CFIR tags to determine a ranking of the relevant skills. For example, the third data may indicate that the first skill will begin playback of the song {Song Name}: "The Curse of an Aching Heart" by {Artist Name}: "Henry Fink." Conversely, the fourth data may indicate that the second skill will generate an error message indicating that the second skill is unable to play music (e.g., the second skill may be configured to control a thermostat). Accordingly, ranking component 120 may use the third data and the fourth data to determine that the first skill should be more highly ranked than the second skill for routing the current request data, based on the CFIR tags received from the first and second skills.

Figure 5A:
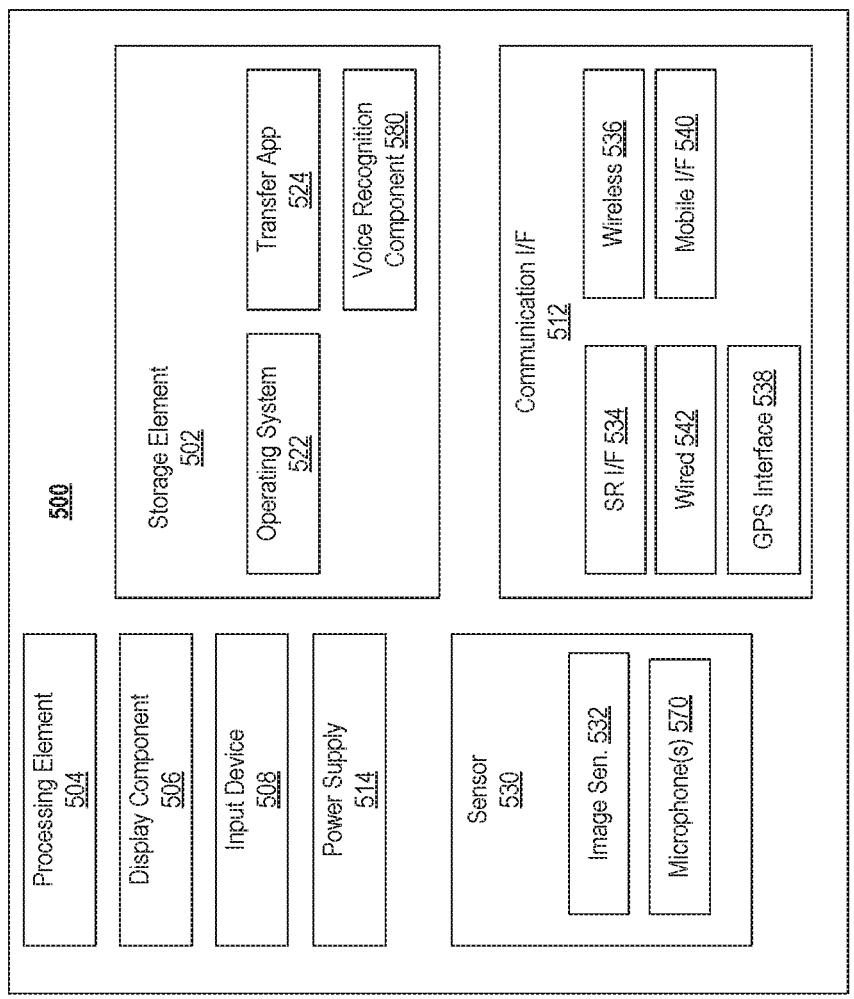
FIGS. 5A-5B are block diagrams showing example architectures of computing devices that may be used in accordance with various embodiments described herein.

FIG. 5A is a block diagram showing an example architecture 500 of a computing device that may be used to implement, at least in part, natural language processing system 100, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). In some examples, the processing element 504 may be effective to determine a wakeword and/or to stream audio data to natural language processing system 100. The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500. In some examples, the transfer application 524 may also be configured to send the received voice requests to one or more voice recognition servers (e.g., natural language processing system 100).

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display content determined provided by a skill executed by the processing element 504 and/or by another computing device.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. Voice recognition component 580 may interpret audio signals of sound captured by microphone 570. In some examples, voice recognition component 580 may listen for a "wakeword" to be received by microphone 570. Upon receipt of the wakeword, voice recognition component 580 may stream audio to a voice recognition server for analysis, such as natural language processing system 100. In various examples, voice recognition component 580 may stream audio to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as a computer communication network, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5A. An example of an image sensor 532 may be a camera configured to capture color information, image geometry information, and/or ambient light information.

Figure 5B:
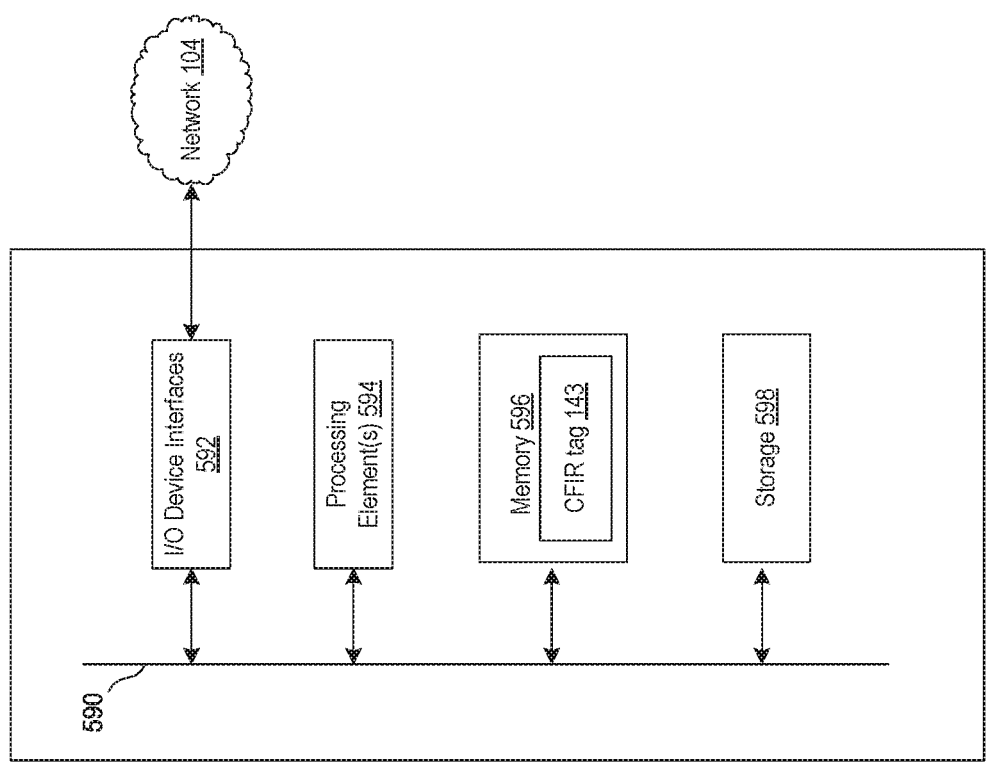

FIG. 5B is a block diagram conceptually illustrating example components of a remote device, such as a computing device executing a particular skill 190, a computing device executing one or more components of natural language processing system 100 (e.g., the ranking and arbitration component 140, ASR processing components, NLU processing components, applicable protocol recognition, etc.) and/or command processing. Multiple computing devices may be included in the system, such as one speech processing computing device for performing ASR processing, one speech processing computing device for performing NLU processing, one or more skill computing device(s) implementing skills 190, etc. In operation, each of these devices (or groups of devices) may include non-transitory computer-readable and computer-executable instructions that reside on the respective device, as will be discussed further below.

Each computing device of natural language processing system 100 may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for particular request data. In some examples, memory 596 may store machine learning models of the ranking component 120, skills 190, shortlister 110, etc., when loaded from storage 598. In various further examples, memory 596 may be effective to store instructions effective to program controllers/processors 594 to perform the various techniques described above in reference to generation of CFIR tag 143 data and/or the CFIR 147 request data described above in reference to FIGS. 1-4. Accordingly, in FIG. 5B, CFIR tag 143 is depicted as being stored within memory 596, as an example. The memories 596 may individually include volatile random access memory (RAM), non-volatile read only memory (ROM), non-volatile magnetoresistive memory (MRAM), and/or other types of memory. Each computing device of natural language processing system 100 may also include storage 598 for storing data and controller/processor-executable instructions. Each data storage component 598 may individually include one or more non-volatile storage types such as magnetic storage, optical storage, solid-state storage, etc. Each computing device of natural language processing system 100 may also be connected to removable or external non-volatile memory and/or storage (such as a removable memory card, memory key drive, networked storage, etc.) through respective input/output device interfaces 592. In various examples, the CFIR tag 143 may be stored in memory 596 and/or storage 598.

Computer instructions for operating each computing device of natural language processing system 100 may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), storage 598, or an external device(s). Alternatively, some or all of the executable instructions may be embedded in hardware or firmware on the respective device in addition to or instead of software.

Each computing device of natural language processing system 100 includes input/output device interfaces 592. A variety of components may be connected through the input/output device interfaces 592, as will be discussed further below. Additionally, each computing device of natural language processing system 100 may include an address/data bus 590 for conveying data among components of the respective device. Each component within a computing device of natural language processing system 100 may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of the natural language processing system 100, as described herein, are exemplary, and may be located as a stand-alone device or may be included, in whole or in part, as a component of a larger device or system.

Figure 6:
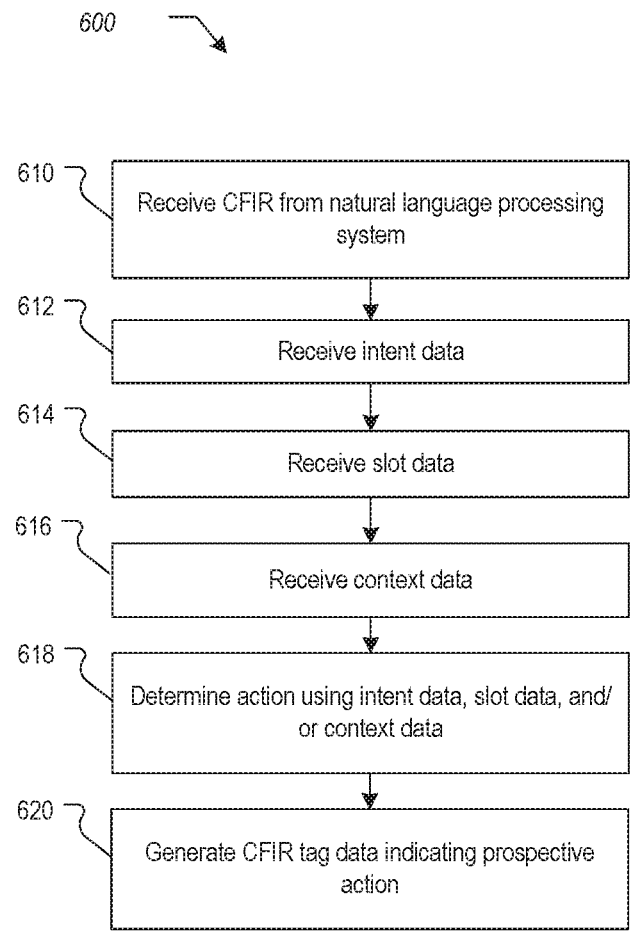
FIG. 6 depicts a flow chart showing an example process for generating CFIR tag data, in accordance with various aspects of the present disclosure.

FIG. 6 depicts a flow chart showing an example process 600 for generating CFIR tag data, in accordance with various aspects of the present disclosure. Those portions of FIG. 6 that have been previously discussed in reference to FIGS. 1-5 may not be described again for purposes of clarity and brevity. The actions of the process 600 may represent a series of instructions comprising computer-readable machine code executable by one or more processing units of one or more computing devices. In various examples, the computer-readable machine code may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

In some examples, process 600 may begin at action 610, at which CFIR (e.g., CFIR 147) may be received from natural language processing system 100. For example, a skill 190 may receive the CFIR 147. Processing may continue at action 612, at which intent data may be received. In various examples, the intent data may be received as part of, and/or in association with, the CFIR. The intent data may be an intent generated by NLU component 160 that semantically represents a request (e.g., a spoken request) received by natural language processing system 100. For example, the intent data may be a <PlayMovieIntent>, a <TurnOnLight> intent, a <StopPlayback> intent, etc.

Processing may continue at action 614, at which slot data may be received. In various examples, the slot data may be received as part of, and/or in association with, the CFIR. The slot data may be an entity name included in the input request data. For example, if the user says "Play Casablanca." "Casablanca" may be an entity representing a movie that the user is requesting for playback. "Casablanca" may be encoded as slot data.

Processing may continue at action 616, at which context data may be received. In various examples, the context data may be received as part of, and/or in association with, the CFIR. The context data may metadata that is associated with the input request data. The context data may include a time of day, a device ID and/or metadata related to the device, location data related to the device, location data associated with an account from which the input request data was received, etc. In general, context data may provide context about the request, the device at which the request was received, and/or about the account associated with the request data. In an example, the input request data may be "Play Casablanca." Context data may indicate that the device that received the input request data may not include a display. Accordingly, the context data may be used to select a music playback action rather than a movie playback action.

Processing may continue to action 618, at which an action may be determined using the intent data, slot data, and/or context data. At action 618, the skill 190 that has received CFIR 197 may determine a prospective action that the skill 190 would take if the input request data is routed to the skill 190 for processing. For example, if the received intent data corresponds to an intent of the skill 190 and the skill is able to understand the received slot data, the skill may indicate an action corresponding to the intent data and slot data. For example, if the skill 190 is a movie playback skill and the intent data is <PlayMovie>, the slot data is Casablanca, and the context data indicates that the input device receiving the request has a display, the skill 190 may determine that the action is to begin streaming the movie Casablanca to the input device. In another example, the skill may determine that the intent data cannot be successfully processed by the skill 190. In such a case, the prospective action may be an error message that states, "I'm sorry. I don't understand your request. Can you rephrase?" Various other actions are possible depending on the particular skill 190 and the particular intent data, slot data, and context data.

Processing may continue to action 620, at which the skill 190 may generate CFIR tag data indicating the prospective action determined by the skill 190 at action 618. The skill 190 may thereafter send the CFIR tag data to the natural language processing system 100. The natural language processing system 100 may use the CFIR tag data as an input to ranking component 120 and may generate a ranked list of skills 190 to which to route the current input request data for further processing.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
receiving, by a natural language processing system, first request data representing a user request;
determining a first candidate skill for processing the first request data;
sending first data to the first candidate skill, the first data representing a request for the first candidate skill to evaluate an ability of the first candidate skill to process the first request data;
receiving, from the first candidate skill, first metadata indicating a type of action that the first candidate skill will perform upon receipt of the first request data;
sending, to a ranking component, the first metadata;
sending, to the ranking component, third data representing a list of candidate skills for processing the first request data, the list of candidate skills comprising the first candidate skill;
selecting, by the ranking component using the first metadata and the list of candidate skills, the first candidate skill for processing the first request data; and
sending the first request data to the first candidate skill for processing.

2. The method of claim 1, further comprising:
determining, after sending the first request data to the first candidate skill, that the first candidate skill performed a different type of action apart from the type of action indicated in the first metadata;
generating a confidence score indicating that the first candidate skill performed a different type of action relative to the type of action indicated by the first metadata;
sending the confidence score to a ranking component configured to generate a ranked list of skills for processing input request data; and
generating, by the ranking component, a ranked list of skills for processing second request data based in part on the confidence score.

3. The method of claim 1, further comprising:
receiving, by the natural language processing system, second request data representing a second user request;
determining a second candidate skill for processing the second request data;
sending fourth data to the second candidate skill, the fourth data representing a second request for the second candidate skill to evaluate an ability of the second candidate skill to process the second request data; and receiving, from the second candidate skill, second metadata indicating that the second candidate skill will initiate a dialog session in response to processing, by the second candidate skill, the second request data.

4. A method comprising:

receiving first input data representing an input request;

sending first data to a first application, the first data representing a first request for the first application to determine a type of action that the first application would perform to process the first input data upon receipt of the first input data;

sending second data to a second application, the second data representing a second request for the second application to determine the type of action that the second application would perform to process the first input data upon receipt of the first input data;

receiving third data from the first application indicating a first type of action performed by the first application in response to receipt of the first input data;

receiving fourth data from the second application indicating a second type of action performed by the second application in response to receipt of the first input data; and selecting the first application for processing the first input data based at least in part on the third data and the fourth data.

5. The method of claim 4, further comprising:

sending the third data and the fourth data to a component effective to rank applications for processing input requests; and determining, by the component, a ranked list of applications for processing the input request, wherein the first application is ranked higher in the ranked list relative to the second application based at least in part on the third data and the fourth data.

6. The method of claim 4, further comprising:

determining intent data representing a semantic interpretation of the input request; and sending the intent data to the first application, wherein the first type of action is determined by the first application based at least in part on an ability of the first application to process the intent data.

7. The method of claim 4, further comprising:

sending fifth data to a third application, the fifth data representing a third request for the third application to determine a type of action that the third application performs in processing the first input data; and receiving sixth data from the third application, the sixth data indicating that the third application initiates a dialog session in response to the first input data.

8. The method of claim 4, further comprising:

sending fifth data to a third application, the fifth data representing a third request for the third application to determine a type of action that the third application performs in processing the first input data; and receiving sixth data from the third application, the sixth data indicating that the third application initiates an error message in response to the first input data.

9. The method of claim 4, further comprising:

sending fifth data to a third application, the fifth data representing a third request for the third application to determine a type of action that the third application performs in processing the first input data; and receiving sixth data from the third application, the sixth data indicating that the third application initiates video playback in response to the first input data.

10. The method of claim 4, further comprising:

sending fifth data to a third application, the fifth data representing a third request for the third application to determine a type of action that the third application performs in processing the first input data; and receiving sixth data from the third application, the sixth data indicating that the third application initiates audio playback in response to the first input data.

11. The method of claim 4, further comprising:

sending fifth data to a third application, the fifth data representing a third request for the third application to determine a type of action that the third application performs in processing the first input data; and receiving sixth data from the third application, the sixth data indicating that the third application changes a setting associated a device in response to the first input data.

12. The method of claim 4, further comprising:

sending fifth data to a third application, the fifth data representing a third request for the third application to determine a type of action that the third application performs in processing the first input data; and receiving sixth data from the third application, the sixth data indicating that the third application generates text data comprising a response to the first input data, wherein the response is output by a text-to-speech component of a natural language processing system.

13. A system comprising:

at least one processor; and non-transitory computer-readable memory storing instructions that, when executed by the at least one processor, are effective to:

receive first input data representing an input request;

send first data to a first application, the first data representing a first request for the first application to determine a type of action that the first application would perform to process the first input data upon receipt of the first input data;

send second data to a second application, the second data representing a second request for the second application to determine the type of action that the second application would perform to process the first input data upon receipt of the first input data;

receive third data from the first application indicating a first type of action performed by the first application in response to receipt of the first input data;

receive fourth data from the second application indicating a second type of action performed by the second application in response to receipt of the first input data; and select the first application for processing the first input data based at least in part on the third data and the fourth data.

14. The system of claim 13, the non-transitory computer-readable memory storing further instructions that, when executed by the at least one processor, are further effective to:

send the third data and the fourth data to a component effective to rank applications for processing input requests; and determine, by the component, a ranked list of applications for processing the input request, wherein the first application is ranked higher in the ranked list relative to the second application based at least in part on the third data and the fourth data.

15. The system of claim 13, the non-transitory computer-readable memory storing further instructions that, when executed by the at least one processor, are further effective to:
send fifth data to a third application, the fifth data representing a third request for the third application to determine a type of action that the third application performs in processing the first input data; and
receive sixth data from the third application, the sixth data indicating that the third application generates text data comprising a response to the first input data, wherein the response is output by a text-to-speech component of a natural language processing system.

16. The system of claim 13, the non-transitory computer-readable memory storing further instructions that, when executed by the at least one processor, are further effective to:
determine intent data representing a semantic interpretation of the input request; and
send the intent data to the first application, wherein the first type of action is determined by the first application based at least in part on an ability of the first application to process the intent data.

17. The system of claim 13, the non-transitory computer-readable memory storing further instructions that, when executed by the at least one processor, are further effective to:
send fifth data to a third application, the fifth data representing a third request for the third application to determine a type of action that the third application performs in processing the first input data; and
receive sixth data from the third application, the sixth data indicating that the third application initiates a dialog session in response to the first input data.

18. The system of claim 13, the non-transitory computer-readable memory storing further instructions that, when executed by the at least one processor, are further effective to:
send fifth data to a third application, the fifth data representing a third request for the third application to determine a type of action that the third application performs in processing the first input data; and
receive sixth data from the third application, the sixth data indicating that the third application initiates an error message in response to the first input data.

19. The system of claim 13, the non-transitory computer-readable memory storing further instructions that, when executed by the at least one processor, are further effective to:
send fifth data to a third application, the fifth data representing a third request for the third application determine a type of action that the third application performs in processing the first input data; and
receive sixth data from the third application, the sixth data indicating that the third application initiates video playback in response to the first input data.

20. The system of claim 13, the non-transitory computer-readable memory storing further instructions that, when executed by the at least one processor, are further effective to:
send fifth data to a third application, the fifth data representing a third request for the third application to determine a type of action that the third application performs in processing the first input data; and
receive sixth data from the third application, the sixth data indicating that the third application initiates audio playback in response to the first input data.

\* \* \* \* \*